US008839257B2

(12) United States Patent
Lukyanov et al.

(10) Patent No.: US 8,839,257 B2
(45) Date of Patent: Sep. 16, 2014

(54) SUPERSEDING OF RECOVERY ACTIONS BASED ON AGGREGATION OF REQUESTS FOR AUTOMATED SEQUENCING AND CANCELLATION

(75) Inventors: Andrey Lukyanov, Redmond, WA (US); Rajmohan Rajagopalan, Redmond, WA (US); Shane Brady, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 291 days.

(21) Appl. No.: 13/302,064

(22) Filed: Nov. 22, 2011

(65) Prior Publication Data

US 2013/0132963 A1 May 23, 2013

(51) Int. Cl.
*G06F 9/46* (2006.01)
*G06F 15/173* (2006.01)
*G06F 13/00* (2006.01)
*G06F 11/00* (2006.01)
*G06F 11/07* (2006.01)
*G06F 21/52* (2013.01)
*G06F 11/14* (2006.01)

(52) U.S. Cl.
CPC ........ *G06F 11/0793* (2013.01); *G06F 11/1438* (2013.01); *G06F 21/52* (2013.01); *G06F 2221/2145* (2013.01); *G06F 2221/2141* (2013.01)
USPC ........... 718/102; 718/100; 718/103; 718/106; 709/225; 709/226; 711/167; 714/100

(58) Field of Classification Search
None
See application file for complete search history.

(56) References Cited

U.S. PATENT DOCUMENTS

| | | | |
|---|---|---|---|
| 5,423,044 A | 6/1995 | Sutton et al. | |
| 5,564,016 A | 10/1996 | Korenshtein | |
| 5,911,143 A | 6/1999 | Deinhart et al. | |
| 6,151,643 A | 11/2000 | Cheng et al. | |
| 6,335,972 B1 | 1/2002 | Chandersekaran et al. | |
| 6,678,826 B1 | 1/2004 | Kelly et al. | |
| 6,694,437 B1 | 2/2004 | Pao et al. | |
| 6,804,773 B1 * | 10/2004 | Grigsby et al. | 713/1 |
| 6,978,367 B1 | 12/2005 | Hind et al. | |
| 7,205,883 B2 | 4/2007 | Bailey | |
| 7,426,654 B2 | 9/2008 | Adams, Jr. et al. | |
| 7,526,685 B2 | 4/2009 | Noy et al. | |
| 7,630,480 B2 | 12/2009 | Fleck et al. | |
| 7,680,822 B1 | 3/2010 | Vyas et al. | |
| 7,698,430 B2 | 4/2010 | Jackson | |
| 7,702,736 B2 | 4/2010 | Ouchi | |
| 7,734,670 B2 | 6/2010 | Poozhiyil et al. | |
| 7,831,833 B2 | 11/2010 | Gaylor | |
| 7,950,051 B1 | 5/2011 | Spitz et al. | |
| 7,992,008 B2 | 8/2011 | Ashok et al. | |

(Continued)

OTHER PUBLICATIONS

Chun-Ying Huang et al., Using one-time passwords to prevent password phishing attacks. J Network Computer Applications (2011), doi:10.1016/j.jnca. Feb. 4, 2011, 10 pages.

(Continued)

*Primary Examiner* — Abdullah Al Kawsar
(74) *Attorney, Agent, or Firm* — Louise Bowman; Jim Ross; Micky Minhas

(57) ABSTRACT

Command sequencing may be provided. Upon receiving a plurality of action requests, an ordered queue comprising at least some of the plurality of actions may be created. The actions may then be performed in the queue's order.

17 Claims, 3 Drawing Sheets

(56) References Cited

U.S. PATENT DOCUMENTS

| | | | |
|---|---|---|---|
| 8,046,558 B2* | 10/2011 | Ghose | 711/167 |
| 8,201,224 B1 | 6/2012 | Spertus | |
| 8,296,827 B2 | 10/2012 | Paganetti et al. | |
| 8,310,923 B1 | 11/2012 | Nordstrom et al. | |
| 8,438,647 B2 | 5/2013 | Jevans | |
| 8,458,455 B2 | 6/2013 | Anderson et al. | |
| 8,458,779 B2 | 6/2013 | Valentine et al. | |
| 2001/0021926 A1 | 9/2001 | Schneck et al. | |
| 2002/0026592 A1 | 2/2002 | Gavrila et al. | |
| 2002/0035521 A1 | 3/2002 | Powers | |
| 2002/0147801 A1 | 10/2002 | Gullotta et al. | |
| 2003/0115148 A1 | 6/2003 | Takhar | |
| 2003/0139962 A1 | 7/2003 | Nobrega et al. | |
| 2005/0050354 A1 | 3/2005 | Gociman | |
| 2005/0154744 A1 | 7/2005 | Morinville | |
| 2005/0193041 A1* | 9/2005 | Bourbonnais et al. | 707/204 |
| 2006/0048224 A1 | 3/2006 | Duncan et al. | |
| 2006/0137007 A1 | 6/2006 | Paatero et al. | |
| 2006/0168079 A1 | 7/2006 | Shen et al. | |
| 2006/0184675 A1* | 8/2006 | Salmre et al. | 709/227 |
| 2006/0242690 A1 | 10/2006 | Wolf et al. | |
| 2006/0265599 A1 | 11/2006 | Kanai | |
| 2007/0028293 A1* | 2/2007 | Boerries et al. | 726/2 |
| 2007/0094334 A1 | 4/2007 | Hoffman et al. | |
| 2007/0124361 A1 | 5/2007 | Lowry et al. | |
| 2007/0180100 A1 | 8/2007 | Biggs et al. | |
| 2007/0185875 A1 | 8/2007 | Chang et al. | |
| 2007/0192416 A1 | 8/2007 | Gupta | |
| 2007/0250920 A1 | 10/2007 | Lindsay | |
| 2007/0289019 A1 | 12/2007 | Lowrey | |
| 2007/0294258 A1 | 12/2007 | Caldwell et al. | |
| 2008/0098485 A1 | 4/2008 | Chiou | |
| 2008/0103916 A1 | 5/2008 | Camarador et al. | |
| 2008/0123854 A1 | 5/2008 | Peel et al. | |
| 2008/0140778 A1 | 6/2008 | Banavar et al. | |
| 2008/0154774 A1 | 6/2008 | Dennison et al. | |
| 2008/0155685 A1 | 6/2008 | Beilinson et al. | |
| 2008/0195936 A1* | 8/2008 | White et al. | 715/246 |
| 2008/0276098 A1 | 11/2008 | Florencio et al. | |
| 2008/0287121 A1 | 11/2008 | Ebrom et al. | |
| 2008/0320310 A1 | 12/2008 | Florencio et al. | |
| 2009/0048881 A1 | 2/2009 | Keane et al. | |
| 2009/0055822 A1 | 2/2009 | Tolman et al. | |
| 2009/0094667 A1 | 4/2009 | Habeck et al. | |
| 2009/0104888 A1 | 4/2009 | Cox | |
| 2009/0193407 A1 | 7/2009 | Lepeska | |
| 2009/0210427 A1 | 8/2009 | Elder et al. | |
| 2009/0249284 A1 | 10/2009 | Antosz et al. | |
| 2009/0271451 A1 | 10/2009 | Young et al. | |
| 2009/0319402 A1* | 12/2009 | Manista et al. | 705/30 |
| 2009/0320107 A1 | 12/2009 | Corella | |
| 2009/0328023 A1* | 12/2009 | Bestland et al. | 717/168 |
| 2010/0011418 A1 | 1/2010 | Despain et al. | |
| 2010/0017589 A1 | 1/2010 | Reed et al. | |
| 2010/0023368 A1* | 1/2010 | Houba | 705/9 |
| 2010/0037056 A1 | 2/2010 | Follis et al. | |
| 2010/0063950 A1 | 3/2010 | Joshi et al. | |
| 2010/0064072 A1* | 3/2010 | Tang et al. | 710/39 |
| 2010/0087941 A1* | 4/2010 | Assaf et al. | 700/101 |
| 2010/0091318 A1* | 4/2010 | Ferlitsch | 358/1.15 |
| 2010/0188287 A1 | 7/2010 | Madsen et al. | |
| 2010/0212008 A1 | 8/2010 | Jaganathan et al. | |
| 2010/0242041 A1* | 9/2010 | Plondke et al. | 718/103 |
| 2010/0257579 A1 | 10/2010 | Karjoth et al. | |
| 2010/0257596 A1 | 10/2010 | Ngo et al. | |
| 2010/0278078 A1 | 11/2010 | Proulx et al. | |
| 2011/0023107 A1 | 1/2011 | Chen et al. | |
| 2011/0078497 A1 | 3/2011 | Lyne et al. | |
| 2011/0099552 A1* | 4/2011 | Avni et al. | 718/103 |
| 2011/0099616 A1 | 4/2011 | Mazur et al. | |
| 2011/0126111 A1 | 5/2011 | Gill et al. | |
| 2011/0191254 A1 | 8/2011 | Womack | |
| 2011/0246426 A1 | 10/2011 | Cho | |
| 2011/0247066 A1 | 10/2011 | Lee | |
| 2011/0252404 A1 | 10/2011 | Park et al. | |
| 2011/0289588 A1 | 11/2011 | Sahai et al. | |
| 2011/0302632 A1 | 12/2011 | Garrett et al. | |
| 2012/0016621 A1 | 1/2012 | Tan et al. | |
| 2012/0096306 A1 | 4/2012 | Akirav et al. | |
| 2012/0144234 A1 | 6/2012 | Clark et al. | |
| 2012/0185911 A1 | 7/2012 | Polite et al. | |
| 2012/0185933 A1 | 7/2012 | Belk et al. | |
| 2012/0209884 A1 | 8/2012 | Mattsson et al. | |
| 2012/0239822 A1 | 9/2012 | Poulson et al. | |
| 2012/0246703 A1 | 9/2012 | MacLeod et al. | |
| 2012/0259720 A1 | 10/2012 | Nuzzi | |
| 2012/0266246 A1 | 10/2012 | Amit et al. | |
| 2012/0317132 A1 | 12/2012 | Brady et al. | |
| 2013/0024918 A1 | 1/2013 | Cramer et al. | |
| 2013/0024947 A1 | 1/2013 | Holland et al. | |
| 2013/0111260 A1 | 5/2013 | Reddy et al. | |
| 2013/0133024 A1 | 5/2013 | MacLeod et al. | |
| 2013/0239166 A1 | 9/2013 | MacLeod et al. | |
| 2014/0165167 A1 | 6/2014 | Nunn et al. | |

OTHER PUBLICATIONS

Dinei Florencio et al., One-Time Password Access to Any Server without Changing the Server, 11th International conference on Information Security '08, Taipei. Sep. 15, 2009, 16 pages.

Joseph Bonneau et al., The Quest to Replace Passwords: A Framework for Comparative Evaluation of Web Authentication Schemes, IEEE Symposium on Security and Privacy (SP), May 20, 2012, 15 pages.

Lockbox. Printed Nov. 20, 2012. Lockbox: Technology Platform, 3 pgs. lock-box.com/technology-platform/.

Stoneware. Printed Nov. 21, 2012. Single Sign-on, 3 pgs. stone-ware.com/webnetwork/lenovo/sso.

U.S. Office Action dated Sep. 30, 2013 cited in U.S. Appl. No. 13/154,660 26 pgs.

U.S. Final Office Action dated Sep. 30, 2013 cited in U.S. Appl. No. 13/301,872, 49 pgs.

Kadar, et al., "Automatic Classification of Change Requests for Improved IT Service Quality", In Proceedings of Annual SRII Global Conference, Mar. 29, 2011, pp. 430-439.

"Deployment Planning, Architecture, and Guidance on System Center Service Manager", Retrieved on: Oct. 3, 2011, Available at: technet.microsoft.com/en-us/library/gg281359.aspx, 10 pages.

"Automating IT: SCSM, SCCM, SCOM, SCVMM, Opalis—Better Together", Retrieved on: Oct. 3, 2011, Available at: blogs.technet.com/b/servicemanager/archive/2010/08/25/automating-it-scsm-sccm-scom-scvmm-opalis-better-together.aspx, 1 page.

"BMC Remedy Change Management 7.0 User's Guide", Published on: Jun. 2006, Available at: dbdocs.iadb.org/wsdocs/getdocument.aspx?docnum=35595995, 410 pages.

U.S. Appl. No. 13/712,688, filed Dec. 12, 2012, entitled "Scalable and Automated Secret Management".

U.S. Official Action dated Nov. 30, 2012 in U.S. Appl. No. 13/052,788.

U.S. Official Action dated Nov. 1, 2012 in U.S. Appl. No. 13/154,660.

U.S. Official Action dated Jan. 14, 2013 in U.S. Appl. No. 13/301,872.

U.S. Final Office Action dated Sep. 24, 2013 cited in U.S. Appl. No. 13/413,078, 46 pgs.

U.S. Final Office Action dated Jul. 2, 2013 cited in U.S. Appl. No. 13/052,788, 27 pgs.

Kadar, et al, article entitled "Automatic Classification of Change Requests for Improved IT Service Quality"—Published Date: Mar. 29, 2011. In proceedings of Annual SRII Global Conference, Mar. 29, 2011, pp. 430-439. Available at: ieeexplore.ieee.org/stamp/stamp.jsp?tp=&arnumber=5958118.

"Automating IT: SCSM, SCCM, SCOM, SCVMM, Opalis—Better Together"—Retrieved Date: Oct. 3, 2011. Available at: blogs.technet.com/b/servicemanager/archive/2010/08/25/automating-it-scsm-sccm-scom-scvmm-opalis-better-together.aspx.

"BMC Remedy Change Management 7.0 User's Guide"—Published Date: Jun. 2006; 410 pages. Available at: idbdocs.iadb.org/wsdocs/getdocument.aspx?docnum=35595995.

(56) References Cited

OTHER PUBLICATIONS

U.S. Office Action dated Apr. 19, 2013 cited in U.S. Appl. No. 13/413,078.
U.S. Office Action dated May 2, 2013 cited in U.S. Appl. No. 13/154,660.
U.S. Appl. No. 13/052,788, filed Mar. 21, 2011, entitled "Email-Based Automated Recovery Action in a Hosted Environment".
U.S. Appl. No. 13/154,660, filed Jun. 7, 2011, entitled "Instance-Based Command Execution, Approval, and Notification Framework".
U.S. Appl. No. 13/301,872, filed Nov. 22, 2011, entitled "Auto-Approval of Recovery Actions Based on an Extensible Set of Conditions and Policies".
U.S. Appl. No. 13/413,078, filed Mar. 6, 2012, entitled "Operating Large Scale Systems and Cloud Service with Zero-Standing Elevated Permissions".
Huhns, M., et al.; "*Service-Oriented Computing: Key Concepts and Principles*"; IEEE Internet Computing Jan./Feb. 2005, IEEE Computer Society; 7 pages.
Wright, T.; "*System Center Service Manager 2010 Release Candidate Released!!*"; Microsoft Corporation; Mar. 3, 2010; 3 pages.
Kaufman, Charlie, et al.; "*Windows Azure™ Security Overview*"; Published Aug. 2010; 24 pgs., Obtained at: globalfoundationservices.com/security/documents/WindowsAzureSecurityOverview1_0Aug2010.pdf.
Publication entitled, "*PCI DSS Compliance in the UNIX/LINUX Datacenter Environment*"; Published Aug. 2009 by BeyondTrust Corporation; 19 pages. Obtained at: http://i.zdnet.com/whitepapers/BeyondTrust_PCIDSSComplianceintheUNIXLinuxDatacenterEnvironment.pdf.
Master Data Services Environment—Retrieved Date: Oct. 4, 2011, Available at: download.microsoft.com/download/5/9/F/59F1639E-EF57-4915-8848-EF1DC2157EBB/02%20MDS%20Environment.pdf, 16 pages.
Stanger, Mark; article entitled "Change Management Workflow Approval Scripts in Service-now.com" Published on Oct. 20, 2010. Available at: www.servicenowguru.com/scripting/change-management-workflow-approval-scripts-servicenowcom/, 5 pages.
"IBM Tivoli Business Continuity Process Manager"—Retrieved Date: Oct. 4, 2011. Available at: www-01.ibm.com/software/tivoli/products/business-continuity-process-mgr/features.html, 2 pages.
"Deployment Planning, Architecture, and Guidance on System Center Service Manager"—Retrieved Date: Oct. 4, 2011. Available at: technet.microsoft.com/en-us/library/gg281359.aspx, 4 pages.
"Change Management Process" Version 1.0—Published Date: May 1, 2006. Available at: its.uncg.edu/Service_Management/Change/ChangeManagementProcess.pdf, 14 pages.
Batishchev, Alexander, M. article entitled, "Getting Elevated privileges on Demand Using C#," published Sep. 9, 2010; 4 pages. Available at: www.codeproject.com/KB/vista-security/ElevatedPrivilegesDemand.aspx.
U.S. Final Office Action dated Mar. 24, 2014 cited in U.S. Appl. No. 13/154,660, 31 pgs.
U.S. Office Action dated Dec. 17, 2013 cited in U.S. Appl. No. 13/052,788.
U.S. Office Action dated Dec. 18, 2013 cited in U.S. Appl. No. 13/712,688.
U.S. Office Action dated Feb. 24, 2014 cited in U.S. Appl. No. 13/413,078, 44 pgs.
U.S. Office Action dated Apr. 22, 2014 in U.S. Appl. No. 13/301,872, 56 pgs.
U.S. Final Office Action dated May 20, 2014 in U.S. Appl. No. 13/052,788, 35 pgs.

\* cited by examiner

SUPERSEDING OF RECOVERY ACTIONS BASED ON AGGREGATION OF REQUESTS FOR AUTOMATED SEQUENCING AND CANCELLATION

RELATED APPLICATION

Related U.S. patent application Ser. No. 13/301,872, filed on even date herewith entitled "Auto-Approval of Recovery Actions Based on an Extensible Set of Conditions and Policies," assigned to the assignee of the present application, is hereby incorporated by reference.

BACKGROUND

Control over recovery actions in a hosted environment may be provided. Hosted computed environments, such as datacenters, rely on automation to provide high level of service availability and customer data security. However, in some cases manual actions by designated support users are required to restore service availability. Often the user is required to execute a sequence of related commands to resolve the issue. It is important to protect hosted service environment from possible errors in manual user actions or intentional misconduct. Conventional solutions require setting up a granular permission model in the hosted environment wherein support users are delegated with a minimal set of permissions to perform their routine tasks. In the event they need to execute a command that can potentially compromise service availability or customer data security, they have to follow a designated approval process, where commands to be executed must be submitted to high privilege expert decision makers (approvers).

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Command sequencing may be provided. Upon receiving a plurality of action requests, an ordered queue comprising at least some of the plurality of actions may be created. The actions may then be performed in the queue's order.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
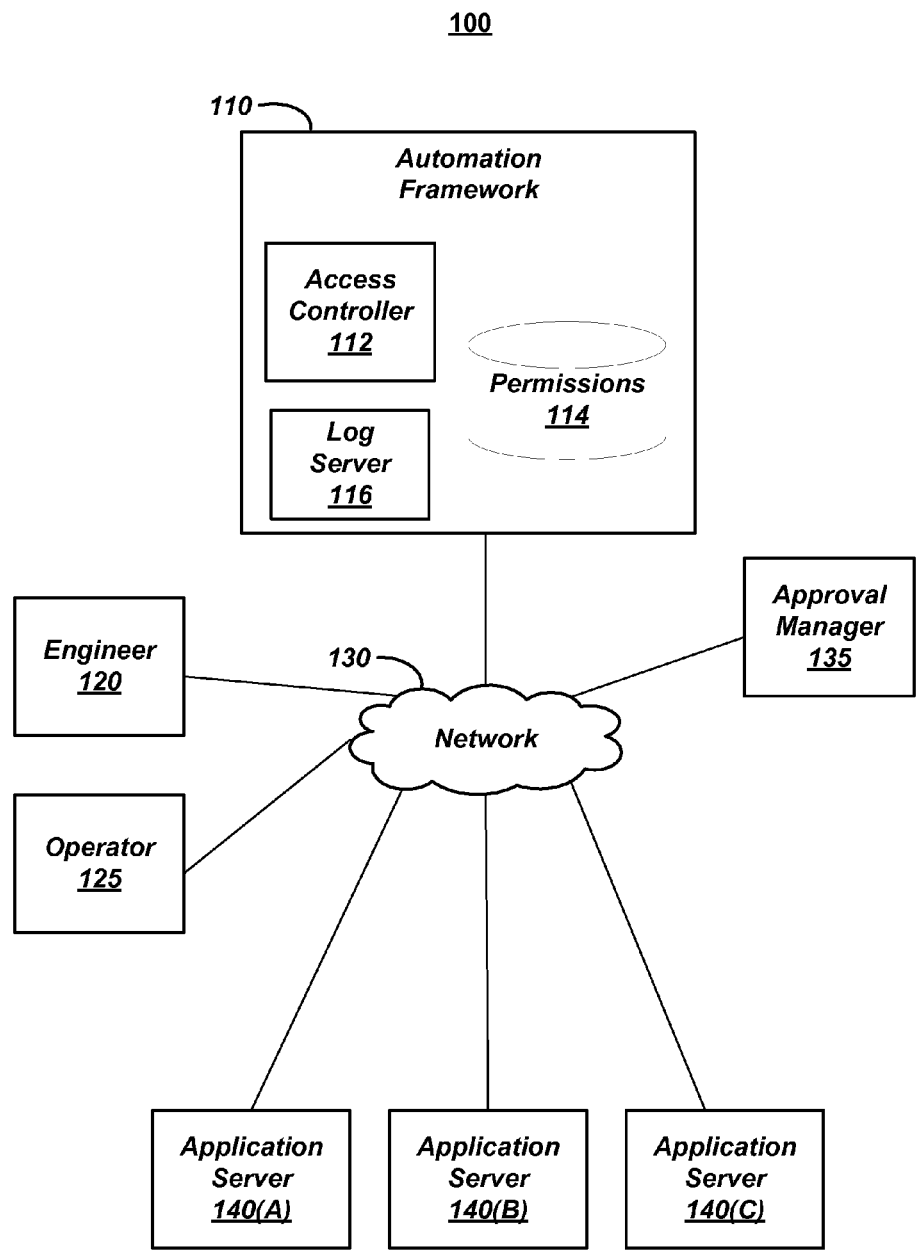
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

When a user is attempting to remedy a service problem, related action requests may be automatically sequenced in order to streamline their approvals. This may aggregate some duplicative requests, supersede other requests and cancel requests that are not needed. The analysis of a sequence of related commands may also allow the notification, such as by email, to potentially impacted tenants in a multi-tenant environment and make them aware of potential downtime caused by certain changes.

FIG. 1 is a block diagram of an operating environment 100 comprising an automation framework 110. Automation framework 110 may comprise an access controller 112, a permissions database 114, and a log server 116. Automation framework 110 may receive action requests from an engineer 120 and/or an operator 125 via a network 130. Action requests may be evaluated by access controller 112 against permissions database 114. The requested actions, such as reboots, log queries, and/or service restarts, may then be inserted into an action queue to be performed. The actions may be performed, for example, on a plurality of application servers 140(A)-(C).

Figure 2:
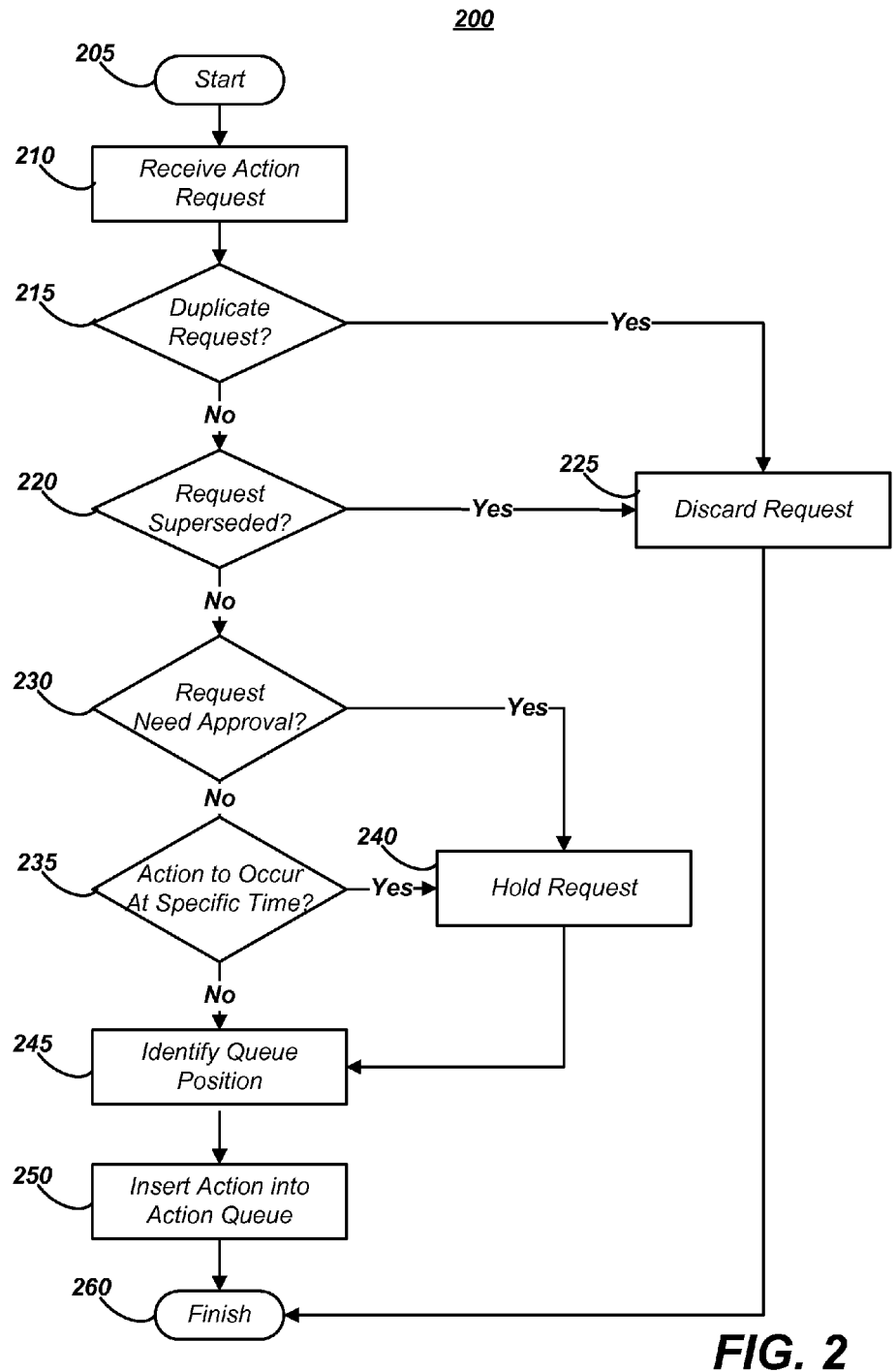
FIG. 2 is a flow chart of a method for providing command sequencing.

FIG. 2 is a flow chart setting forth the general stages involved in a method 200 consistent with an embodiment of the invention for providing command sequencing. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may receive a new action request. For example, engineer 120 may submit a request to restart a service (e.g., a domain name service) that is experiencing a fault on application server 140(A).

Method 200 may then advance to stage 215 where computing device 300 may determine whether the requested action is a duplicate of an action request already in an action queue. For example, the action queue may already comprise a request to restart the faulty service.

If the requested action is not a duplicate, method 200 may advance to stage 220 where computing device 300 may determine whether the new action request is superseded by an action request already in the action queue. For example, automation framework 110 may determine whether the new action request and the queued action request are each associated with correcting the same fault condition (e.g., the new request may be to modify a configuration for a service for which a request to restart the service is already queued.) For another example, automation framework 110 may determine whether the scope of the new action request falls within the scope of the at least one second action request (e.g., the queued request may comprise a reboot of application server 140(A) while the new request is to restart a service on application server 140(A)).

If the new action is determined to comprise a duplicate action at stage 215, or if the new action is determined to be superseded at stage 220, method 200 may advance to stage 225 where computing device 300 may discard the new action request. Method 200 may then end at stage 260.

Otherwise, method 200 may advance to stage 230 where computing device 300 may determine whether the new action request requires approval. For example, a request to reboot application server 140(A) may require approval from an approval manager 135.

Method 200 may then advance to stage 235 where computing device 300 may determine whether the new action request comprises an activation time. For example, a request to reboot application server 140(A) may comprise a requested execution time of midnight.

If the requested action is determined to require approval at stage 230 or that the activation request comprises a requested execution time at stage 235, method 200 may advance to stage 240 where computing device 300 may hold the new action request out of the action queue. Consistent with embodiments of the invention, computing device 300 may determine whether any already queued actions in the action queue are dependent on the held action request. If so, those actions may be withdrawn from the queue until the held action is released for insertion into the action queue, as described below with respect to stage 245.

Method 200 may then advance to stage 245 where computing device 300 may identify a queue position for the new action request in the action queue. For example, automation framework 110 may consider factors such as a priority of a user associated with the new action request, a sequence number associated with the new action request, and/or a dependency of the new action request upon an already queued action request.

Method 200 may then advance to stage 250 where computing device 300 may insert the new action request into the action queue at the identified queue position. Method 200 may then end at stage 260.

An embodiment consistent with the invention may comprise a system for providing command sequencing. The system may comprise a memory storage and a processing unit coupled to the memory storage. The processing unit may be operative to receive a plurality of action requests, create an ordered queue comprising at least some of the plurality of actions, and perform the actions in order of the queue.

Another embodiment consistent with the invention may comprise a system for providing command sequencing. The system may comprise a memory storage and a processing unit coupled to the memory storage. The processing unit may be operative to receive an action request, identify a sequence priority for the action request according to at least one condition, insert the action request into an action queue comprising a plurality of action requests, and perform at least one first action request of the action queue.

Yet another embodiment consistent with the invention may comprise a system for providing command sequencing. The system may comprise a memory storage and a processing unit coupled to the memory storage. The processing unit may be operative to receive a new action request and determining whether the new action request comprises a duplicate of a queued action request in an action queue or whether the new action request is superseded by a queued action request in the action queue. In case of duplication or superseding by a queued action, the processing unit may be operative to discard the new action request. The processing unit may be further operative to determine whether the new action request requires approval and/or whether the new action request comprises an activation time. In either case, the processing unit may be operative to hold the new action request out of the action queue until approval is received or until the activation time, determine whether an already queued action request in the action queue comprises a dependency on the held action request, and, if so, withdraw the already queued action request from the action queue until the new action is ready to be queued. The processing unit may be further operative to identify a queue position for the new action request in the action queue and insert the new action request into the action queue at the identified queue position.

Figure 3:
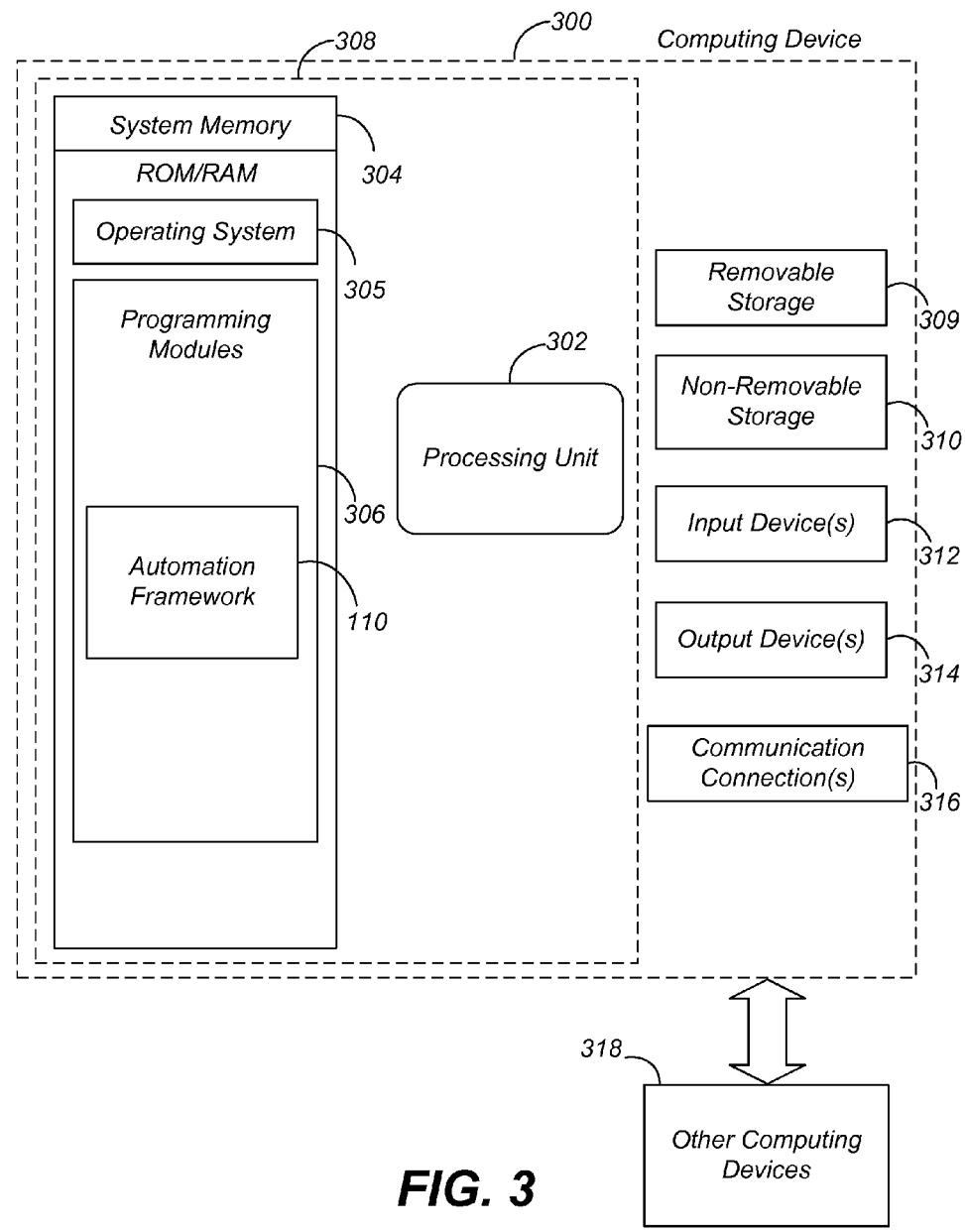
FIG. 3 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 3 and the associated descriptions provide a discussion of a variety of operating environments in which embodiments of the invention may be practiced. However, the devices and systems illustrated and discussed with respect to FIG. 3 are for purposes of example and illustration and are not limiting of a vast number of computing device configurations that may be utilized for practicing embodiments of the invention, described herein.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 300 as described above. Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include automation framework 110. Operating system 305, for example, may be suitable for controlling computing device 300's operation.

Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A computer memory which stores a set of instructions which when executed performs a method for providing command sequencing, the method executed by the set of instructions comprising:
   receiving a new action request;
   determining whether the new action request comprises a duplicate of at least one first action request in an action queue, wherein the action queue comprises a plurality of action requests in an order to be performed;
   in response to determining that the new action request comprises a duplicate of at least one first action request in the action queue, discarding the new action request;
   determining whether the new action request is superseded by at least one second action request in the action queue when the new action request is not a duplicate of the at least one first action request, wherein determining whether the new action request is superseded by the at least one second action request in the action queue comprises at least one of the following:
   determining whether the new action request and the at least one second action request are each associated with correcting a fault condition and determining whether the scope of the new action request falls within the scope of the at least one second action request;
      in response to determining that the new action request is superseded by the at least one second action request in the action queue, discarding the new action request;
      determining whether the new action request requires approval when the new action request is not superseded by the at least one second action request;
      in response to determining that the new action request requires approval, holding the new action request out of the action queue;
      determining whether the new action request comprises an activation time when the new action request does not require approval;
      in response to determining that the new action request comprises an activation time:
         holding the new action request out of the action queue until the activation time,
         determining whether at least one third action request in the action queue comprises a dependency on the new action request held out of the action queue, and
         in response to determining that the at least one third action request in the action queue comprises a dependency on the new action request, withdrawing the at least one third action request from the action queue until the activation time;
      identifying a queue position for the new action request in the action queue after reaching the activation time, wherein the queue position is based on at least one of the following: a priority of a user associated with the new action request, a sequence number associated with the new action request, and a dependency of the new action request upon at least one fourth action request in the action queue; and
   inserting the new action request into the action queue at the identified queue position.

2. A method for providing command sequencing, the method comprising:
   receiving a new action request;
   determining whether the new action request requires approval;
   in response to determining that the new action request requires approval, holding the new action request out of an action queue, wherein the action queue comprises a plurality of action requests in an order to be performed;
   determining whether the new action request comprises an activation time when the new action request does not require approval;
   in response to determining that the new action request comprises the activation time:
      holding the new action request out of the action queue until the activation time,
      determining whether at least one first action request in the action queue comprises a dependency on the new action request held out of the action queue, and in response to determining that the at least one first action request in the action queue comprises a dependency on the new action request, withdrawing the at least one first action request from the action queue until the activation time;

identifying a queue position for the new action request in the action queue after reaching the activation time; and inserting the new action request into the action queue at the identified queue position.

3. The method of claim 2, further comprising determining whether the new action request comprises a duplicate of at least one second action request in the action queue.

4. The method of claim 3, further comprising, in response to determining that the new action request comprises a duplicate of at least one second action request in the action queue, discarding the new action request.

5. The method of claim 2, further comprising determining whether the new action request is superseded by at least one third action request in the action queue.

6. The method of claim 5, wherein determining whether the new action request is superseded by the at least one third action request in the action queue comprises determining whether the new action request and the at least one third action request are each associated with correcting a fault condition.

7. The method of claim 5, wherein determining whether the new action request is superseded by the at least one third action request in the action queue comprises and determining whether the scope of the new action request falls within the scope of the at least one third action request.

8. The method of claim 5, further comprising, in response to determining that the new action request is superseded by the at least one third action request in the action queue, discarding the new action request.

9. The method of claim 2, wherein the queue position is based on a priority of a user associated with the new action request.

10. The method of claim 2, wherein the queue position is based on a sequence number associated with the new action request.

11. The method of claim 2, wherein the queue position is based on a dependency of the new action request upon at least one fourth action request in the action queue.

12. A system for providing command sequencing, the system comprising:

a memory storage; and a processing unit coupled to the memory storage, wherein the processing unit is operable to:

receiving a new action request;

determining whether the new action request requires approval;

in response to determining that the new action request requires approval, hold the new action request out of an action queue, wherein the action queue comprises a plurality of action requests in an order to be performed;

determine whether the new action request comprises an activation time when the new action request does not require approval;

in response to determining that the new action request comprises the activation time:

holding the new action request out of the action queue until the activation time, determining whether at least one first action request in the action queue comprises a dependency on the new action request held out of the action queue, and in response to determining that the at least one first action request in the action queue comprises a dependency on the new action request, withdraw the at least one first action request from the action queue until the activation time;

identify a queue position for the new action request in the action queue after reaching the activation time; and insert the new action request into the action queue at the identified queue position.

13. The system of claim 12, wherein the processing unit is further operable to:

determine whether the new action request comprises a duplicate of at least one second action request in the action queue; and in response to determining that the new action request comprises a duplicate of at least one second action request in the action queue, discard the new action request.

14. The system of claim 13, wherein the processing unit is further operable to determine whether the new action request is superseded by at least one third action request in the action queue.

15. The system of claim 14, wherein the processing unit being further operable to determine whether the new action request is superseded by the at least one third action request in the action queue comprises one of the following: the processing unit being further operable to determine whether the new action request and the at least one third action request are each associated with correcting a fault condition and the processing unit being operable to determine whether the scope of the new action request falls within the scope of the at least one third action request.

16. The system of claim 14, wherein the processing unit being further operable to, in response to determining that the new action request is superseded by the at least one third action request in the action queue, discard the new action request.

17. The system of claim 12, wherein the queue position is based on at least one of the following: a priority of a user associated with the new action request; a sequence number associated with the new action request; and a dependency of the new action request upon at least one fourth action request in the action queue.

* * * * *